US007267368B2

(12) United States Patent
Lagsdin

(10) Patent No.: US 7,267,368 B2
(45) Date of Patent: Sep. 11, 2007

(54) STABILIZER PAD FOR VEHICLES

(76) Inventor: Andry Lagsdin, 54 King Hill Rd., Hanover, MA (US) 02339

( * ) Notice: Subject to any disclaimer, the term of this patent is extended or adjusted under 35 U.S.C. 154(b) by 135 days.

(21) Appl. No.: 10/892,555

(22) Filed: Jul. 16, 2004

(65) Prior Publication Data

US 2006/0011800 A1 Jan. 19, 2006

(51) Int. Cl.
*B60S 9/02* (2006.01)

(52) U.S. Cl. .............................. 280/763.1; 248/188.8; 248/677

(58) Field of Classification Search ............. 280/764.1, 280/766.1, 762, 763.1; 248/188.8, 677, 188.9, 248/632, 615

See application file for complete search history.

(56) References Cited

U.S. PATENT DOCUMENTS 3,721,458 A * 3/1973 Mitchell .................. 280/764.1
3,913,942 A * 10/1975 MacKenzie et al. ..... 280/764.1
3,930,668 A * 1/1976 Schuermann et al. .... 280/763.1
4,013,308 A * 3/1977 Paul ........................ 280/766.1
4,039,206 A * 8/1977 Nault ....................... 280/763.1
4,473,239 A * 9/1984 Smart ...................... 280/763.1
4,986,557 A * 1/1991 Muszynski .................. 280/298
5,409,251 A * 4/1995 Thorndyke .................. 280/475
6,726,246 B2 * 4/2004 Lagsdin ................... 280/763.1

* cited by examiner

*Primary Examiner*—Christopher P. Ellis
*Assistant Examiner*—Bridget Avery
(74) *Attorney, Agent, or Firm*—David M. Driscoll, Esq.

(57) ABSTRACT

A stabilizer pad apparatus that includes a pair of plate members; and a pad assembly that is adapted for mounting from the pair of plate members. The pad assembly includes a resilient pad having at least one ground engageable work surface and a holder for the resilient pad. A first pivot is provided for supporting the pair of plate members from a stabilizer base; and a second pivot is provided that is substantially transverse to the first pivot for supporting the pad assembly from the plate members.

20 Claims, 5 Drawing Sheets

STABILIZER PAD FOR VEHICLES

FIELD OF THE INVENTION

The present invention relates generally to stabilizer pads for vehicles, and pertains more particularly to pivotally mounted stabilizer pads.

BACKGROUND OF THE INVENTION

Most of the major backhoes in production today utilize a stabilizer leg design where the leg (arm) attaches to the frame utilizing a pivot or hinge pin that is basically parallel to the ground, with it's axis extending in the machine front to rear orientation, when the machine is on its wheels, that is, unsupported by either the stabilizer leg or the front bucket. The stabilizer pad mounting pin to the arm connection, which is parallel to the arm pin, allows the stabilizer pad to pivot so that it is parallel to the ground when supporting or raising the machine.

In some machines there may be an unusual stabilizer leg or arm geometry due to the fact that the stabilizer pad is oriented so as to not make contact with the cab structures when the stabilizer leg is in the up position. In these machines the stabilizer arm mounting pin, on the other hand, may be approximately 5 degrees from being parallel in relationship to the ground and this geometry creates an undesirable situation for the stabilizer pad which is mounted on the opposite end of the arm by a pivot pin that is parallel to the arm pivot pin. As a result the pad is very seldom in even parallel contact with the ground when the arm is lowered to support and raise the machine. This, in turn, creates very uneven loading on the resilient surface of the stabilizer pad which results in an uneven wear pattern and premature failure of the resilient pad surface.

Accordingly, it is an objective of the present invention to provide an improved stabilizer pad construction that allows the pad to remain parallel to the ground supporting surface when the arm is used to support and raise the machine. The improved pad construction enables this ground parallel support, within certain rotational limits, regardless of the arm pivoting structure and arm orientation.

SUMMARY OF THE INVENTION

To accomplish the foregoing objective, in accordance with the present invention there is provided a stabilizer pad apparatus that comprises a pair of plate members; and a pad assembly that is adapted for mounting from the pair of plate members. The pad assembly includes a resilient pad having at least one ground engageable work surface and a holder for the resilient pad. A first pivot is provided for supporting the pair of plate members from a stabilizer base; and a second pivot is provided that is substantially transverse to the first pivot for supporting the pad assembly from the plate members.

Additional features of the present invention include a pair of side plates between opposite respective sides of the resilient pad and opposite respective sides of the holder. The resilient pad may be a laminated pad including multiple layers, and including a series of pins that hold the layers together, the ends of which engage holes in the side plates. The pad assembly may also include a pair of bolts passing through the holder, side plates and resilient pad. The holder may comprise a walled open pan that receives the resilient pad. The first pivot is defined by a pivot pin that extends between the pair of plate members. The second pivot may include a pair of end plates supported from the plate members. The holder has opposite end rotational flanges that engage with holes in the end plates. The holder preferably has at least one hole for access to the resilient pad for removal thereof. The resilient pad may be formed of multiple layers.

In accordance with other embodiments of the present invention there is provided a stabilizer pad apparatus in which the holder comprises a support plate, and means for securing the resilient pad to an underside surface of the support plate. The means for securing may include a pair of unshaped bracket and associated fasteners. The second pivot may include oppositely disposed rods attached to the support plate and pivoted from the plate members.

In accordance with another aspect of the present invention there is provided a stabilizer pad apparatus that comprises a metal weldment that is adapted for support from a stabilizer arm of a machine; a resilient pad that is adapted for ground engagement on at least one side thereof; a holder for the resilient pad for supporting the resilient pad from the weldment; and a pivot for supporting the holder from the weldment to permit limited rotation therebetween.

BRIEF DESCRIPTION OF THE DRAWINGS

For a better understanding of the present invention, reference is made to the drawings which are incorporated herein by reference and in which.

DETAILED DESCRIPTION OF PREFERRED EMBODIMENTS

Figure 1:
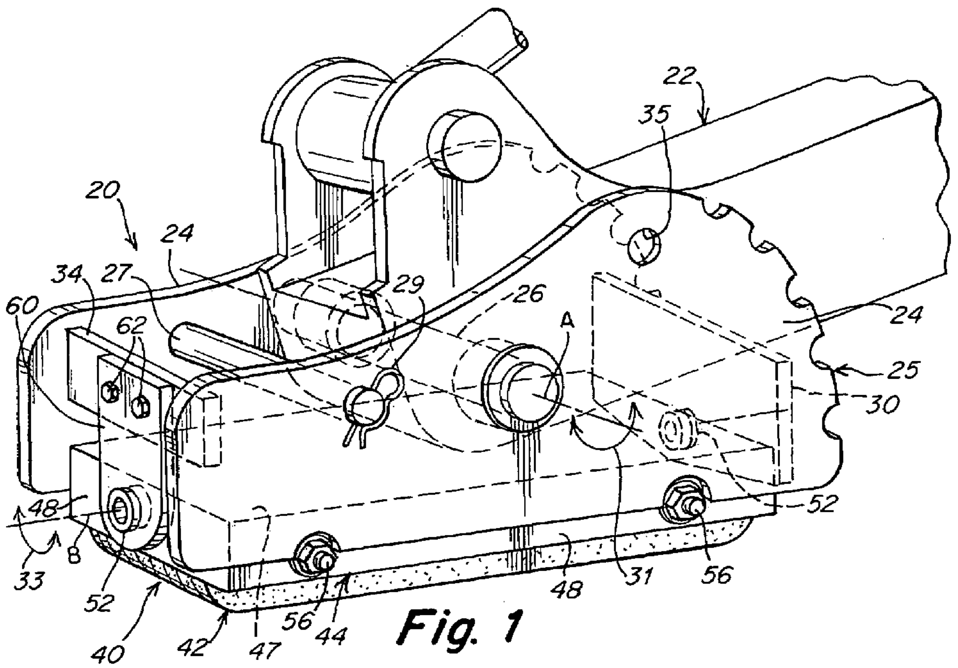
FIG. 1 is a perspective view of one embodiment of the stabilizer pad of this invention as attached to a stabilizer arm.
Figure 2:
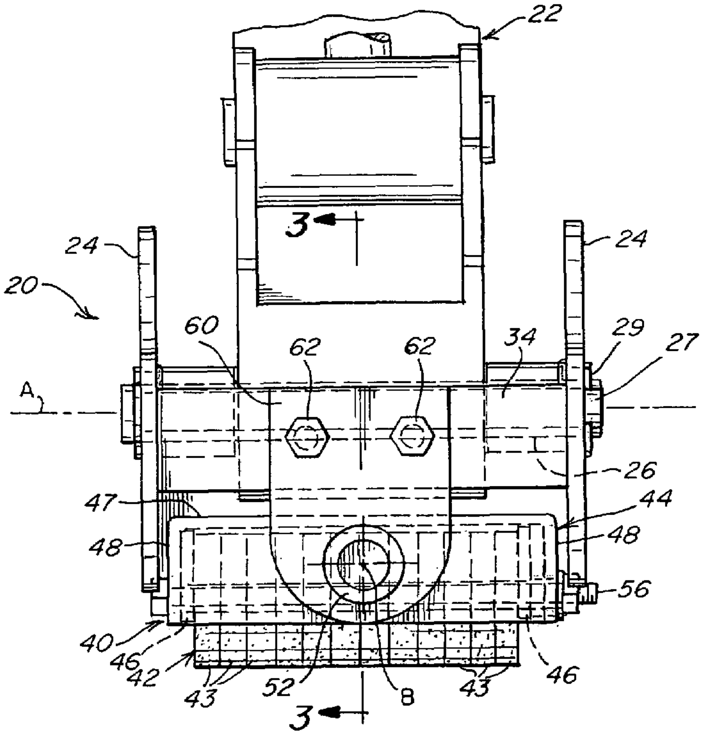
FIG. 2 is a front elevation view of the stabilizer pad of FIG. 1.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In the following descriptions the following patents and applications are also incorporated by reference herein in their entirety. These documents describe further details of stabilizer pad structures. U.S. Pat. Nos. 3,897,079; 3,913, 942; 4,023,828; 4,761,021; 4,889,362; 5,050,904; 5,054,812; 5,466,004; 5,547,220; 5,667,245; 5,957,496; 5,992,883; 6,109,650; 6,270,119; 6,422,603; 6,471,246; 6,634,672; 6,726,246; U.S. application Ser. Nos. 10/387,898; 10/632,242; 10/773,867.

Figure 7:
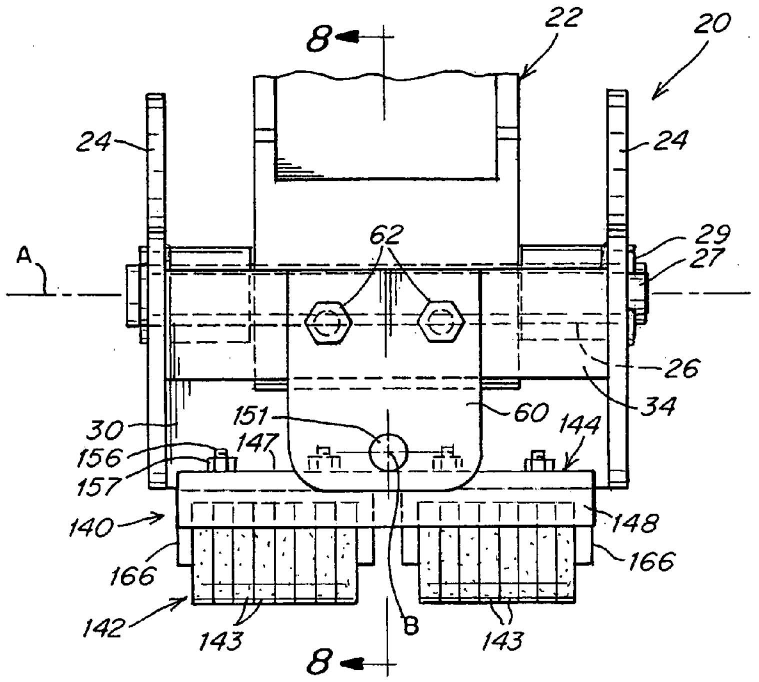
FIG. 7 is a front elevation view of an alternate embodiment of a stabilizer pad.
Figure 8:
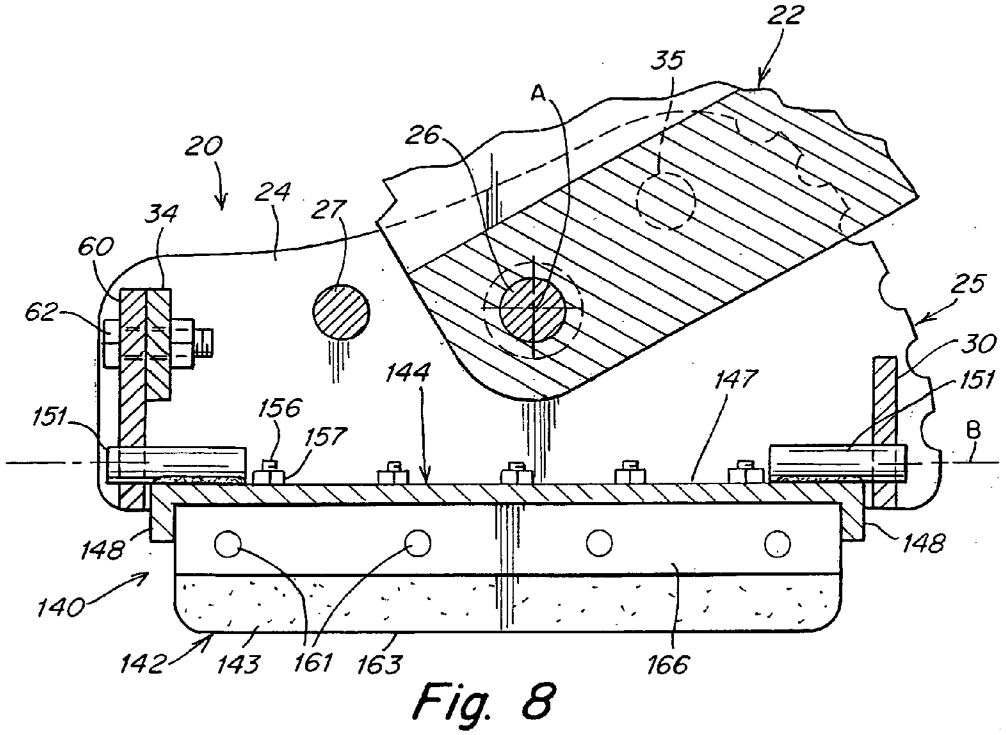
FIG. 8 is a cross-sectional side view of the alternate stabilizer pad of FIG. 7 as taken along line 8-8 of FIG. 7.
Figure 9:
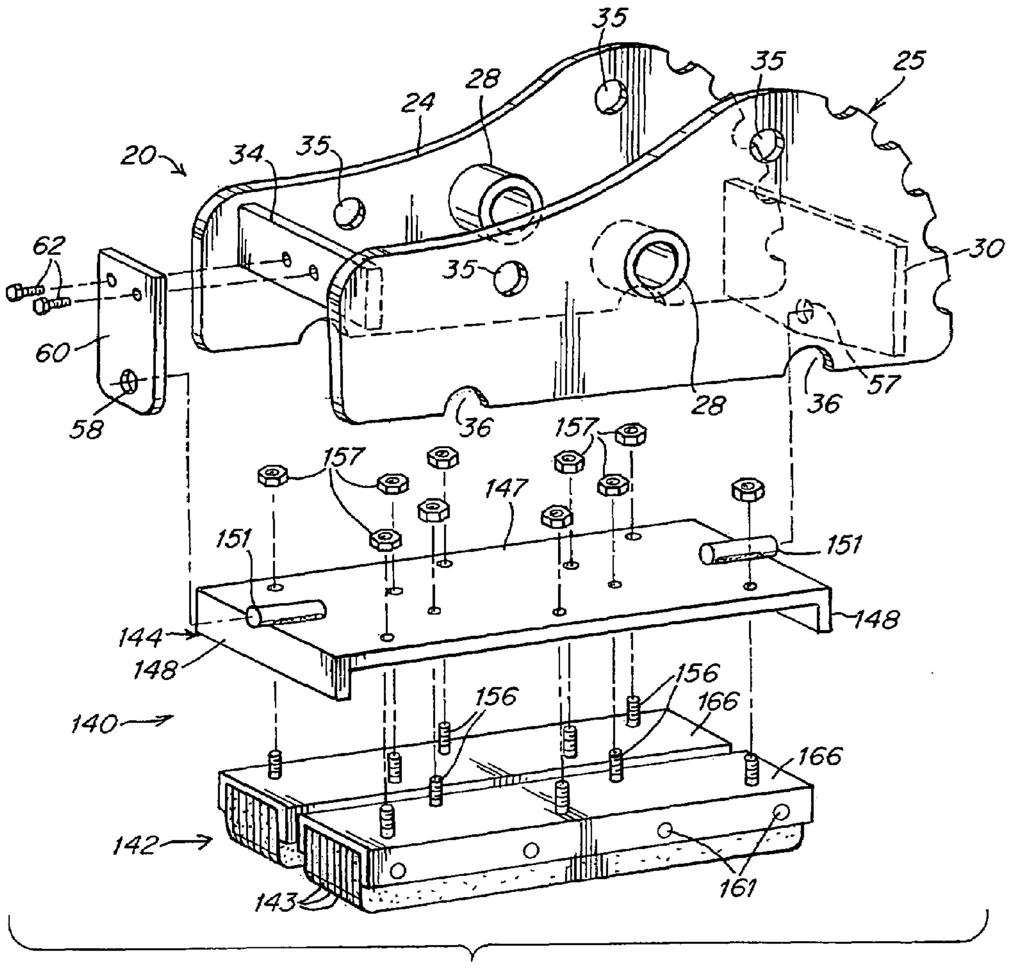
FIG. 9 is an exploded perspective view of the stabilizer pad of the alternate embodiment of FIG. 7.

A first embodiment of the present invention is depicted in FIGS. 1-6. A second embodiment of the present invention is depicted in FIGS. 7-9. In both of the illustrated embodiments the pad arrangement is constructed so that the pad can pivot, about a first axis, from the vehicle stabilizer arm. When the pad arrangement is used on, for example, a backhoe/loader vehicle this first axis extends generally in a direction front-to-back of the vehicle, when in use. To compensate for stabilizer arms that may be slightly tilted forward or back of the center line of the machine, the pad arrangement also has a second pivot, about a second axis, that is preferably transverse to the first axis direction, and that is generally in a direction side-to-side of the vehicle, when in use. In the first embodiment of the present invention, such as in FIG. 1 the first axis is pivot axis A, while the second axis is the pivot axis B. In the second embodiment of the present invention, such as in FIG. 7 the first axis is similarly pivot axis A, while the second axis is similarly the pivot axis B.

One embodiment of a stabilizer pad 20 in accordance with the present invention will now be described with reference to FIGS. 1-6. The second embodiment in FIGS. 7-9 is described hereinafter. Stabilizer pads that are described in accordance with embodiments of the present invention may be used with a backhoe/loader machine or vehicle, and may also be used with other types of vehicles or machines having stabilizing members for stabilization thereof. The concepts described herein may be applied to either street type pads (primarily for use only on a solid pavement) or reversible pads using grousers. Also, the concepts described herein may be applied to either one-sided pads (resilient pad not meant to be reversed) or two-sided pads (resilient pad meant to be reversed from one side to the other).

Figure 3:
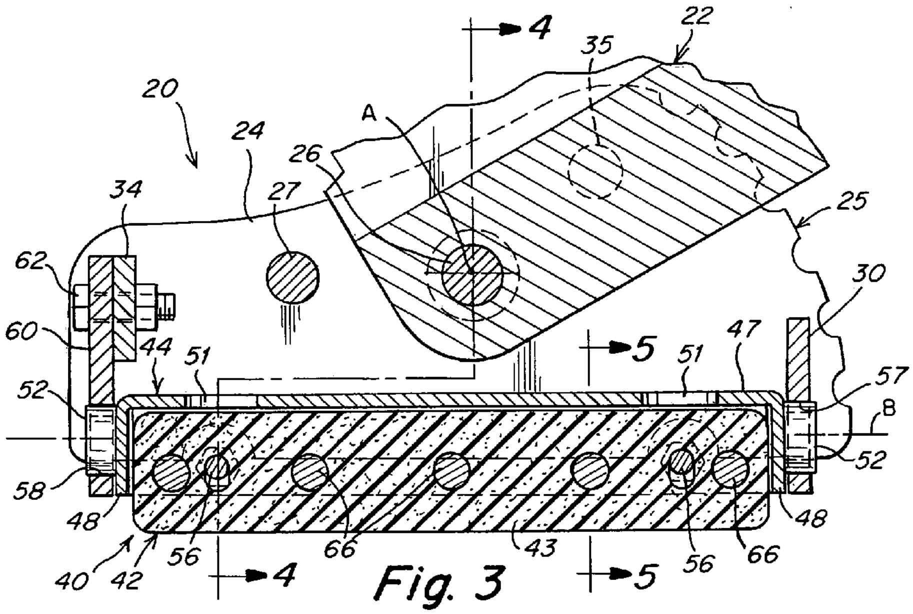
FIG. 3 is a cross-sectional side view of the stabilizer pad of FIG. 1, as taken along line 3-3 of FIG. 2.
Figure 4:
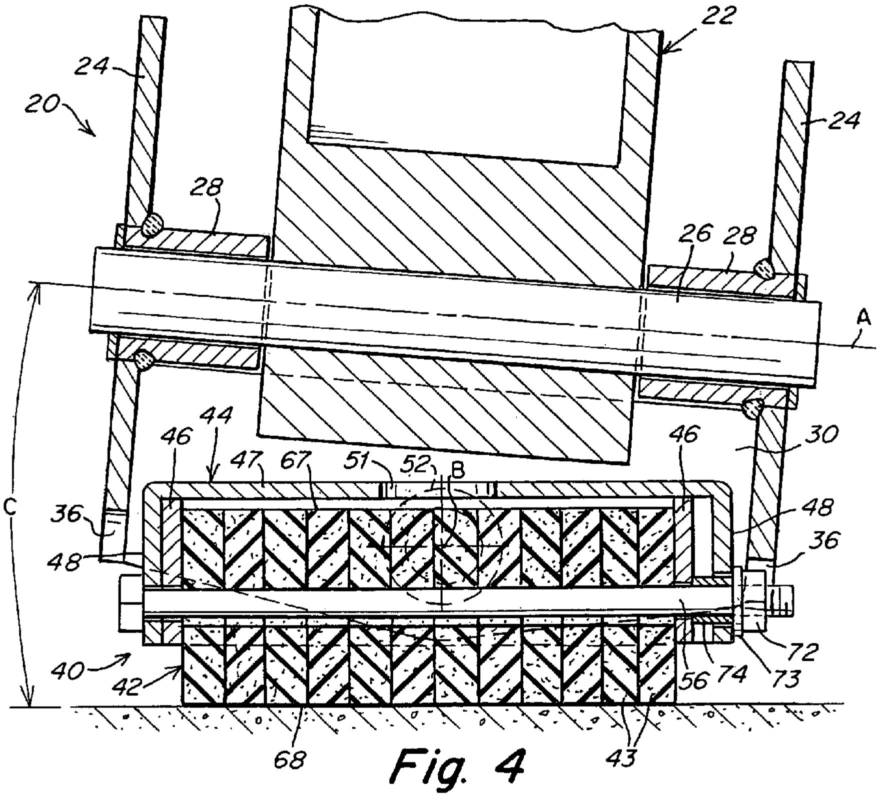
FIG. 4 is a cross-sectional front view of the stabilizer pad of FIG. 1 as taken along line 4-4 of FIG. 3 and showing the arm axis as tilted to the ground.
Figure 5:
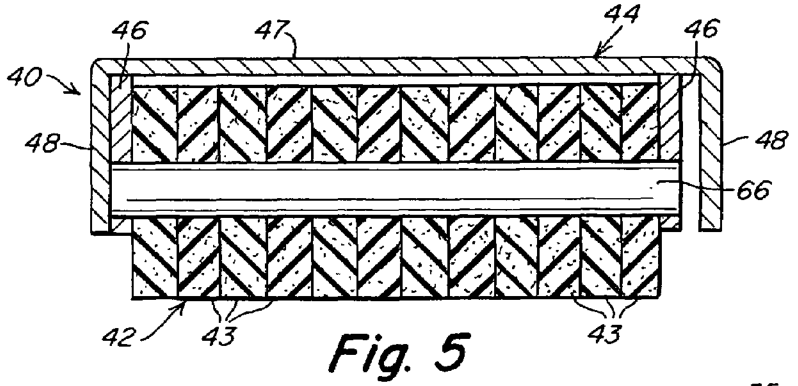
FIG. 5 is a cross-sectional front view of the stabilizer pad of FIG. 1 as taken along line 5-5 of FIG. 3.
Figure 6:
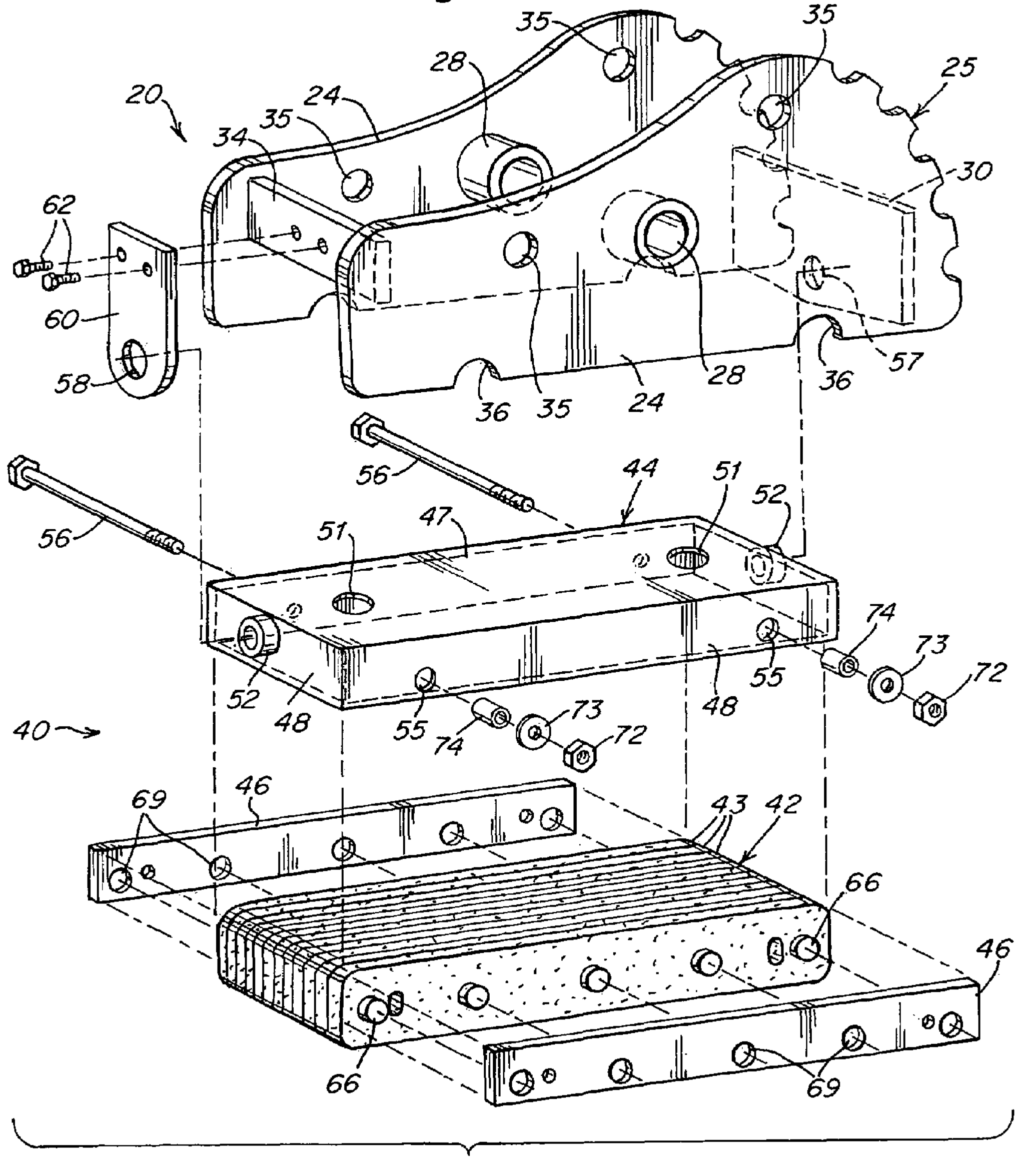
FIG. 6 is an exploded perspective view of the stabilizer pad of FIG. 1.

In the embodiment of FIGS. 1-6, the stabilizer pad 20 is shown mounted to a stabilizer arm 22 (base) of a backhoe/loader machine. This particular embodiment is a reversible pad having a resilient side and also a grouser side. FIGS. 1 and 6 show the grouser points 25. A cross rod 27, and its associated hitch pin 29, illustrated in FIG. 1, may be used to limit the rotation of the pad between opposite positions (prevents self-flipping). The pad 20 is mounted by means of the support pin or axle 26 that intercouples the distal end of the stabilizer arm with the stabilizer pad 20. The pin 26 may be either a one-piece or two-piece pin. FIG. 4 illustrates the one-piece pin 26. In this embodiment the resilient laminated pad itself is reversible so as to provide two opposite work surfaces between which the pad can be positioned.

The stabilizer pad 20 includes a pair of plate members 24 each having a support collar 28 (FIGS. 4 and 6) for receiving the pin 26. In FIG. 1 arrow 31 depicts the direction of rotation of the stabilizer pad 20 relative to the stabilizer arm 22 about axis A. FIG. 1 also depicts the orthogonal rotation of the pad by arrow 33 about axis B. The pair of plate members 24 are connected together by means of the cross bars 30 and 34. These cross bars may be welded at each end to the plate members 24 forming a unitary weldment. Each of the plate members 24 is also provided with aligned holes 35 for receiving the cross rod 27. FIG. 1 depicts the cross rod 27 in place in one of the sets of aligned holes for assisting in maintaining the pad in the resilient pad side. The other set of aligned holes 35 can receive the cross rod 27 when the pad assembly is rotated, about axis A, to the grouser side of the pad. In that position the cross rod 27 essentially locks the pad assembly in the grouser side position with limited rotation. The stabilizer pad 20 also includes lower cut-outs 36 (FIGS. 4 and 6) for accommodating fasteners, as discussed in more detail hereinafter.

The plate members 24 support the pad assembly 40 therebetween, pivoted at opposite ends to enable slight transverse rotation of the pad assembly about axis B. The pad assembly 40 includes the laminated resilient pad 42, the support pan 44, side plates 46 and various fasteners that are described later. The support pan 44 is meant for somewhat permanent positioning in the weldment while the laminated resilient pad 42 is replaceable. The support pan 44 has a top wall 47 and four side walls 48 that together form a metal panned structure that is dimensioned to be accommodated between the plate members 24, and to receive the laminated resilient pad 42. The top wall 47 is provided with access holes 51 so as to enable one to remove the resilient pad 42 should it get stuck within the support pan. Two holes 51 are illustrated but it is understood that one, or more than two holes may be used. Opposite end walls 48 of the support pan 44 have attached thereto, preferably by welding, circular flanges 52 that are instrumental in pivoting the pad assembly 40 from the weldment about axis B. The circular flanges 52 may be constructed of 2.25 inch outer diameter pipe segments. The support pan 44 is also provided with pairs of holes 55 (see FIG. 6) in the other side walls 48 for accommodating securing bolts 56.

The support pan 44 is pivotally supported between the plate members 24 from the cross bars 30 and 34. One of the flanges 52 fits within a hole 57 in the cross bar 30. At the opposite end of the support pan 44, the other flange 52 is retained in a hole 58 in the retaining piece 60. The retaining piece 60, in turn, is fixed by screws 62 to the cross bar 34. The flanges, being round, enable slight rotation of the pad assembly relative to the weldment (plate members 24 and cross bars 30, 34). FIG. 4 shows this rotation by arrow C. The possible angle of rotation may be in a range of 3 to 10 degrees, preferably around 5 degrees.

The laminated resilient pad or rubber pack 42 is meant to engage between the lateral side plates or plate members 24. The pad pack 42 is illustrated in FIGS. 1-6, and is formed of a plurality of laminated rubber layers 43 that are stacked together to form the pack. These layers may be compressed and the support rods 66 then engaged. The support for the pack is preferably about midway of the pack so that it can be readily reversed from one working surface to the other. These working surfaces are depicted in FIG. 4 as ground engaging or working surfaces 67 and 68. FIG. 4 shows the work surface 68 in ground engagement. In the embodiments described herein a force fit may used to secure the rods or pins 66 in place. However, there may be a need in certain applications to secure these pins or rods more positively. This may be accomplished by means of a pin structure that is in the form of a reinforcing rod or other roughened surface rod or pin. Also refer to other ways of securing the rods or pins in place such as described in U.S. patent application Ser. Nos. 10/632,242; 10/773,867, which are incorporated by reference herein.

A jig or the like may be used to stack the laminate layers 43 with the layers having been drilled with holes of a diameter so that the rods 66 have to be force-fitted into the holes. In this way the rods are held firmly in place and the laminate layers are also firmly stacked against each other. This forms a unitary pad pack 42 that can be easily secured in place with the use of only a couple of securing pins or bolts 56 and associated nuts. In an alternate arrangement, in place of the laminated structure, a solid molded resilient pad can be employed.

As indicated hereinbefore, the pad assembly 40 also includes the side plates 46, one on either side of the resilient laminated pack 42. Each of these side plates 46 has a series of linearly arranged holes 69 (see FIG. 6), the pattern of which matches the placement of the rods or pins 66 in the resilient pad 42. The side plates 46 and laminated pack 42 are also provided with holes that line up with the holes 55 in the support pan 44 for accommodating the securing bolts 56. The exploded perspective view of FIG. 6 clearly shows the arrangement of the pack 42 and side plates 46. FIG. 6 also shows the nuts 72, washers 73 and spacers 74 associated, respectively, with the securing bolts 56.

Refer also to FIGS. 3 and 4 for further details of the pad construction. The cross-sectional view of FIG. 3 is taken through the laminated pad pack 42 showing the securing bolts 56 in place and the rods 66 that tie the laminate structure together. FIG. 4 is another cross-sectional view illustrating, in particular, the manner in which the pad pack is held in place. In FIG. 4 it is noted that the spacer or bushing 74 is pressed against one of the side plates 46 against an end layer of the laminate pad 42. The nut 72 and washer 73 are urged against the bushing 74 and support pan 44, thus clamping the entire laminated resilient pad structure to the support pan. There is a clearance hole 55 about the bushing 74. The nut 72 and washer 73 snug up against the side of the support pan 44. As indicated before, FIG. 4 also shows the tilt of the pad structure about axis B. The cut-outs 36 in the respective plate members 24 accommodate this slight movement, as is illustrated in FIG. 4.

The pad pack 42 is also readily reversible once one side thereof is worn down. The pad pack is then dis-assembled by removal of the securing pins or bolts 56 and the pad pack is reversed in position. For example, if the surface 68 is the first working surface and gets worn down, the pad pack can then be reversed 180 degrees so that the surface 69 then is facing downwardly and functions as the ground-engaging surface. Once the bolts 56 are withdrawn the pad pack 42 and side plates 46 can be removed from the support pan 44. The pad pack 42 can then be reversed in position. The embodiment depicted in FIGS. 1-6 is also provided with a grouser point side so that, not only is the pad pack reversible, but the weldment itself can be reversed between respective resilient and grouser point sides.

Reference is now made to a second embodiment of the present invention that is illustrated herein in FIGS. 7-9. This stabilizer pad construction is reversible between resilient and grouser sides, as with the first embodiment. However, the second embodiment uses a non-reversible resilient member, actually two members supported side-by-side, as illustrated in FIG. 9. In this second embodiment of the invention the same reference characters are used to identify similar elements found in the first embodiment.

In the embodiment of FIGS. 7-9, the stabilizer pad 20 is shown mounted to a stabilizer arm 22 of a backhoe/loader machine. This particular embodiment is a reversible pad having a resilient side and also a grouser side. FIG. 9 shows the grouser points 25. A cross rod 27 and its associated hitch pin 29 may be used to limit the rotation of the pad between opposite positions (prevents self-flipping), as in the first embodiment. The pad 20 is mounted by means of the support pin or axle 26 that intercouples the distal end of the stabilizer arm with the stabilizer pad 20. The pin 26 may be either a one-piece or two-piece pin. FIG. 7 illustrates the one-piece pin 26. In this embodiment the resilient laminated pad itself is non-reversible, but readily replaceable.

In the second embodiment the stabilizer pad 20 includes a pair of plate members 24 each having a support collar 28 (FIG. 9) for receiving the pin 26. In FIGS. 7 and 8 the direction of rotation of the stabilizer pad 20 relative to the stabilizer arm 22 is about axis A. FIGS. 7 and 8 also depict the orthogonal rotation of the pad about axis B. The pair of plate members 24 are connected together by means of the cross bars 30 and 34. These cross bars may be welded at each end to the plate members 24 forming a unitary weldment. Each of the plate members 24 is also provided with aligned holes 35 for receiving the cross rod 27. FIG. 1 depicts the cross rod 27 in place in one of the sets of aligned holes for assisting in maintaining the pad in the resilient pad side. The other set of aligned holes 35 can receive the cross rod when the pad assembly is rotated, about axis A, to the grouser side of the pad. In that position the cross rod essentially locks the pad assembly in the grouser side position. The stabilizer pad 20 also includes lower cut-outs 36 (FIG. 9) for accommodating fasteners, as discussed in more detail hereinafter.

The plate members 24 support the pad assembly 140 therebetween, pivoted at opposite ends to enable slight transverse rotation of the pad assembly about axis B. The pad assembly 140 includes the laminated resilient pad 142, the support plate 144 and various fasteners that are described later. The support plate 144 is meant for somewhat permanent positioning in the weldment while the laminated resilient pad 142 is replaceable. The support plate 144 has a top surface 147 and two end walls 148 that together form a structure that is dimensioned to be accommodated between the plate members 24, and to receive, or have attached thereto, the laminated resilient pad structure 142. The top surface 147 is provided with a pair of end rods 151 welded thereto so as to enable pivoting of the pad assembly 140 from the weldment. The tubular rods 151 may be constructed of one half inch diameter metal rods.

The support plate 144 is pivotally supported between the plate members 24 from the cross bars 30 and 34. One of the rods 151 fits within a hole 57 in the cross bar 30. At the opposite end of the support plate 144, the other rod 151 is retained in a hole 58 in the retaining piece 60. The retaining piece 60, in turn, is fixed by screws 62 to the cross bar 34. The rods 151, being round, enable slight rotation of the pad assembly relative to the weldment (plate members 24 and cross bars 30, 34). This is like FIG. 4 which shows this rotation by arrow C. The possible angle of rotation may be in a range of 3 to 10 degrees, preferably around 5 degrees.

The laminated resilient pad or rubber pack 142 is meant to engage between the lateral side plates or plate members 24. The pad pack 142 is illustrated in FIGS. 7-9, and is formed of a plurality of laminated rubber layers 143 that are stacked together to form the rwo separate packs in the embodiment of FIGS. 7-9. These layers may be compressed between U-shaped holders 166 and pins or rods 161 may be used through both the laminated stack and walls of the holder to tie the pad assembly together. The support for each pack is preferably above the midway of the pack so as to provide a sufficient wear surface 163.

In the embodiments described herein a force fit may used to secure the rods or pins 161 in place. However, there may be a need in certain applications to secure these pins or rods more positively. This may be accomplished by means of a pin structure that is in the form of a reinforcing rod or other roughened surface rod or pin.

A jig or the like may be used to stack the laminate layers 143 with the layers having been drilled with holes of a diameter so that the rods 161 have to be force-fitted into the holes. In this way the rods are held firmly in place and the laminate layers are also firmly stacked against each other. This forms a unitary pad pack 142 that can be easily secured in place with the use of a few securing studs 156 and associated nuts 157. FIG. 9 illustrates the support plate 144 and the two pad assemblies 142. The plate surface 147 has a series of holes for accommodating the studs 156. FIGS. 7 and 8 show the final position of the pad assemblies. In an alternate arrangement, in place of the laminated structure, a solid molded resilient pad can be employed.

The second embodiment of the invention provides a relatively simple structure having the characteristic of limited pivoting in a transverse direction to accommodate any slight deviation of the main support pin from the horizontal. The main pivot is shown at axis A while the offsetting pivot is at axis B. Again, refer to FIG. 4 for an illustration of how the pad surface is essentially self-leveling even when the main pin axis is angularly displaced.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A stabilizer pad apparatus comprising:
a pair of plate members;
a pad assembly;
said pad assembly including a resilient pad having at least one ground engageable work surface and holder for said resilient pad;
said holder at least partially mounted between said pair of plate members;
a first pivot for supporting said pair of plate members from a stabilizer base; and
a second pivot that is substantially transverse to said first pivot for supporting said pad assembly from said plate members.

2. The stabilizer pad apparatus of claim 1 wherein said pad assembly also includes a pair of side plates between opposite respective sides of the holder.

3. The stabilizer pad apparatus of claim 1 wherein said holder comprises a walled open pan that receives the resilient pad therein.

4. The stabilizer pad apparatus of claim 1 wherein the first pivot is defined by a pivot pin that extends between said pair of plate members.

5. The stabilizer pad apparatus of claim 1 further including oppositely disposed cross members having respective pivot holes for supporting the holder from the plate members.

6. The stabilizer pad apparatus of claim 1 wherein said holder has at least one hole for access to the resilient pad for removal thereof.

7. The stabilizer pad apparatus of claim 1 wherein said resilient pad is formed of multiple layers.

8. The stabilizer pad apparatus of claim 1 wherein said holder comprises a support plate, and means for securing the resilient pad to an underside surface of said support plate.

9. The stabilizer pad apparatus of claim 2 wherein the resilient pad is a laminated pad including multiple layers, and including a series of pins that hold the layers together, the ends of the pins engage holes in said side plates.

10. The stabilizer pad apparatus of claim 8 wherein the means for securing includes a pair of u-shaped holders and associated fasteners.

11. A stabilizer pad apparatus comprising:
a pair of plate members;
a pad assembly that is adapted for mounting from said pair of plate members;
said pad assembly including a resilient pad having at least one ground engageable work surface and holder for said resilient pad;
a first pivot for supporting said pair of plate members from a stabilizer base; and
wherein said pad assembly also includes a pair of side plates between opposite respective sides of the holder;
a second pivot that is substantially transverse to said first pivot for supporting said pad assembly from said plate members;
wherein the resilient pad is a laminated pad including multiple layers, and including a series of pins that hold the layers together, the ends of the pins engage holes in said side plate; and
wherein said pad assembly also includes a pair of bolts passing through the holder, side plates and resilient pad.

12. A stabilizer pad apparatus comprising:
a pair of plate members:
a pad assembly that is adapted for mounting from said pair of plate members;
said pad assembly including a resilient pad having at least one ground engageable work surface and holder for said resilient pad;
a first pivot for supporting said pair of plate members from a stabilizer base; and
wherein said pad assembly also includes a pair of side plates between opposite respective sides of the holder;
a second pivot that is substantially transverse to said first pivot for supporting said pad assembly from said plate members;
further including oppositely disposed cross members having respective pivot holes for supporting the holder from the plate members and
wherein the holder has opposite end rotational flanges that engage with said holes in the cross members.

13. A stabilizer pad apparatus comprising:
a pair of plate members;
a pad assembly that is adapted for mounting from said pair of plate members;
said pad assembly including a resilient pad having at least one ground engageable work surface and holder for said resilient pad;
a first pivot for supporting said pair of plate members from a stabilizer base; and
a second pivot that is substantially transverse to said first pivot for supporting said pad assembly from said plate members;
wherein said holder comprises a support plate, and means for securing the resilient pad to an underside surface of said support plate;
wherein said second pivot includes oppositely disposed rods attached to said support plate and pivoted from said plate members.

14. A stabilizer pad apparatus comprising:
a metal weldment that is adapted for pivotal support from a stabilizer arm of a machine;
a resilient pad that is adapted for ground engagement on at least one side thereof;

a holder for said resilient pad for supporting said resilient pad from said weldment; and a pivot for supporting said holder from said weldment to permit limited rotation therebetween;

wherein the pivotal support from the stabilizer arm is about a first axis and the pivot for supporting the holder is about a second axis that is transverse to the first axis;

and wherein at least a portion of said holder is mounted between spaced plate members of the weldment.

15. The stabilizer pad apparatus of claim 14 wherein the pivotal support of the weldment is about a first axis that is substantially in a direction that is front-to-back of the machine, and the pivot is about a second axis that is substantially in a direction that is side-to-side of the machine.

16. The stabilizer pad apparatus of claim 14 including fastener means for removably securing the resilient pad to the holder.

17. The stabilizer pad apparatus of claim 14 wherein the resilient pad is a laminated pad having oppositely disposed ground engageable work surfaces.

18. A stabilizer pad apparatus comprising:

a pair of plate members defining a space therebetween;

a first pivot support member for supporting said pair of plate members substantially in spaced parallel relationship therebetween from a stabilizer base and about a first pivot that extends between said plate members and base, said first pivot extending traverse to the plane of said plate members;

a pad assembly including a first holder part and a second resilient pad part having a work surface for ground engagement;

a second pivot support member for supporting at least a portion of said first holder part of said pad assembly in the space defined between said pair of plate members, and the work surface of said second resilient pad part being disposed outside of said space defined between said pair of plate members so as to enable ground engagement; and said second pivot support member including a second pivot that extends transverse to said first pivot.

19. The apparatus of claim 18 including a pair of cross members that respectively extend between said plate members at opposed ends of said plate members.

20. The apparatus of claim 19 wherein said second support member comprises separate pivot members mounted from respective cross members.

* * * * *